Nov. 23, 1965

C. H. FULLER 3,219,836

ELECTRICAL SIGNAL INVERTER

Filed Jan. 13, 1961

CHARLES H. FULLER
INVENTOR.

BY Arthur Decker

ATTORNEY

United States Patent Office 3,219,836
Patented Nov. 23, 1965

3,219,836
ELECTRICAL SIGNAL INVERTER
Charles H. Fuller, Woodland Hills, Calif., assignor, by mesne assignments, to The Bunker-Ramo Corporation, Stamford, Conn., a corporation of Delaware
Filed Jan. 13, 1961, Ser. No. 82,521
9 Claims. (Cl. 307—88.5)

This invention relates to signal converters and more particularly to a circuit capable of inverting the polarity of a signal applied thereto.

It is an object of the present invention to provide a simple, reliable, inexpensive circuit which will accurately invert the polarity of signals applied thereto without appreciable attenuation, drift or alterations of D.-C. level, and includes, in essence, a switching device for alternately connecting an inductance in parallel with the signal source and an output storage device at a rate exceeding the frequency of the signal.

In the inversion, the invention makes use of the principle that a voltage applied to an inductor will set up a magnetic field around the inductor which will not change instantaneously. Accordingly, the signal is applied to the inductor, thereby causing current to flow through the inductor to set up a magnetic field around the inductor. The inductor is then switched rapidly in shunt with an output capacitor. Since the magnetic field around the inductor tends to remain constant, the current flowing through the inductor also tends to remain constant. Accordingly, a current flows which charges the output capacitor in a polarity opposite to that of the signal. Inasmuch as the switching occurs at a rate exceeding the frequency of the input signal, and other circuit parameters are appropriately selected, the output signal of the circuit is characterized by low distortion and, essentially, the circuit may operate at unity gain.

Figure 1:
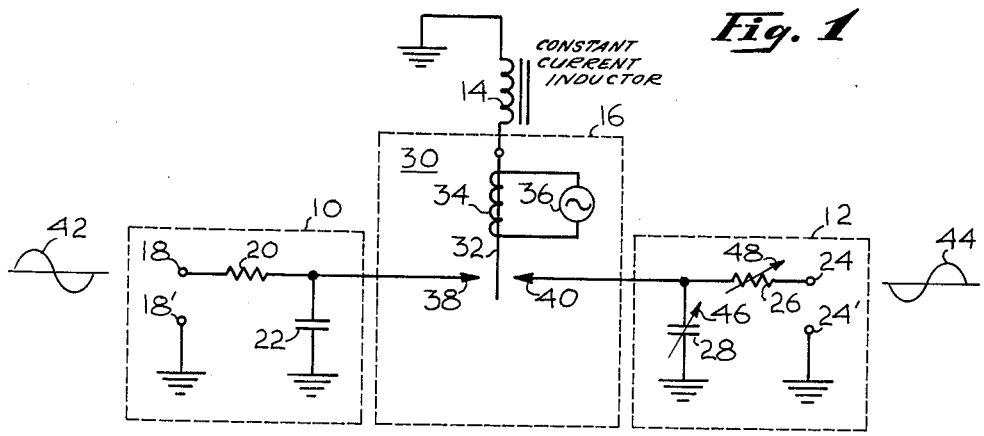
Figure 2:
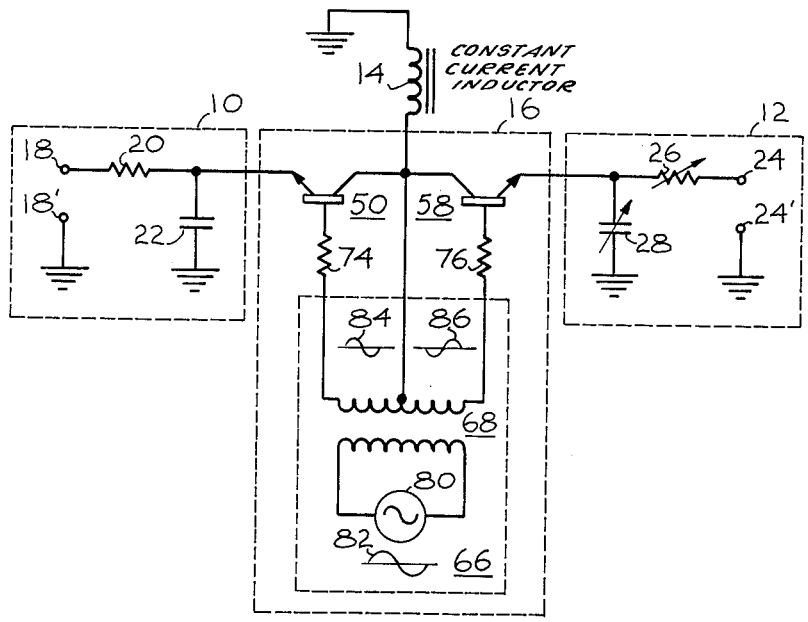

The operation briefly described above as well as other features and objects of the present invention may be more clearly understood by reference to the following detailed description when taken in connection with the drawings, in which:

FIGURE 1 is a schematic diagram of a form of the invention in which a vibrator type switch is used, and FIGURE 2 is a schematic diagram of a form of the invention in which transistor switches are used.

Referring to FIGURE 1, here is illustrated input circuit 10, output circuit 12, inductor 14, and switching means 16, shown as vibrator 30, for alternately connecting inductor 14 in parallel with input and output circuits 10 and 12, respectively. More particularly, input circuit 10 comprises input terminals 18 and 18' shunted by the serial combination of isolating resistor 20 and storage capacitor 22. Input signal 42, shown typically as having a sine waveshape, is applied to terminal 18, terminal 18' is grounded, and the junction of resistor 20 and capacitor 22 is connected to contact 38 of vibrator 30. Output circuit 12 comprises output terminals 24 and 24' shunted by the serial combination of isolating resistor 26 and storage capacitor 28. Inverted output signal 44 is developed at terminal 24, terminal 24' is grounded and the junction of resistor 26 and capacitor 28 is connected to contact 40 of vibrator 30. Vibrator 30, well known in the art, further includes armature 32 and coil 34, the latter being connected to source 36 for energization. Also connected between armature 32 and ground is inductor 14, which, as armature 32 vibrates, is caused to alternate connection between contacts 38 and 40, and, consequently, input circuit 10 and output circuit 12, respectively.

With regard to circuit parameters, it is preferred that values be such that the input signal, within reasonable limits of frequency, amplitude or waveshape, as determined by the application, shall not suffer distortion, i.e., the voltage on contact 38 shall substantially "follow" the input signal. Further, for inversion efficiency, the rate at which armature 32 alternates between contacts 38 and 40 should be substantially greater than the frequency of the input signal; therefore, the frequency of energization by source 36 should be appreciably greater than that of signal 42.

With regard to operation, a signal, such as that represented by waveform 42, applied between input terminals 18 and 18', charges capacitor 22. Due then to the operation of vibrator 30, armature 32 impinges upon contact 38, thereby allowing current to flow through inductor 14 to ground. This current flow sets up a magnetic field around inductor 14 which is proportional to the charge in capacitor 22. Then, again due to the operation of vibrator 30, armature 32 impinges upon contact 40, and capacitor 28 is connected to inductor 14. Since the operating frequency of vibrator 30 exceeds considerably the frequency of signal 42, the magnetic field around inductor 14 cannot collapse, and, in resisting instantaneous change, tends to maintain the current flow to ground. This current is coupled from ground through capacitor 28, charging capacitor 28 in a polarity opposite to that of the charge in capacitor 22. Thus, between output terminals 24 and 24', an output signal is developed having a waveform 44, the inversion of waveform 42, substantially as represented.

As previously noted, for accurate inversion of an input signal, it is desirable that the rate at which armature 32 of vibrator 30 alternates be considerably greater than the frequency of the input signals. The reason for this is that, when inductor 14 is coupled to input circuit 10, it is desired that there be set up a magnetic field around a current in inductor 14 which are proportional to the voltage impressed upon capacitor 22. Further, when inductor 14 is disconnected from input circuit 10, it is desired that the magnetic field and current tend to remain constant in amplitude and direction. Thus, if output circuit 12 is rapidly connected to inductor 14, the magnetic field and current will still be proportional to the instantaneous voltage level of capacitor 22. Therefore, if the impedance level of input circuit 10 is substantially equal to the impedance level of output circuit 12, the current flow in inductor 14 will be such as to charge capacitor 28 to substantially the same voltage magnitude as that impressed upon capacitor 22. In practice, it has been found that for maximum efficiency (output signal magnitude approximating input signal magnitude), the rate at which armature 32 vibrates between contacts 38 and 40 should be approximately 100 times the frequency of the input signal. However, if some distortion of signal may be tolerated, much lower frequency ratios may be used.

It may be noted that, if it should be desired that the output signal be of a voltage amplitude which is a multiple of the voltage amplitude of the input signal, components of the circuit, such as capacitor 28 and/or resistor 26, may be made adjustable, as represented by arrows 46 and 48, respectively, thereby varying the impedance of, for instance, output circuit 12. Such a variation in the magnitude of output impedance can cause a voltage gain or loss to occur in the circuit.

Referring now to FIGURE 2, here is illustrated a form of the invention which includes a pair of transistor switches in switching means 16, thereby providing a completely electronic operation. As illustrated, switching means 16 comprises a transistor chopper circuit of a type well known in the art. Input transistor 50 is connected with its emitter to the junction of capacitor 22 and resistor 20 and its collector connected to inductor 14. Output transistor 58 is connected similarly with respect to output circuit 12 and its collector is also connected to inductor 14. The bases of transistors 50 and 58 are connected to resistors 74 and 76, respectively, the other ends of which resistors are connected to opposite terminals of the secondary of transformer 68; the center tap of the secondary of transformer 68 is connected to the junction of inductor 14 with the collectors of transistors 50 and 58. The primary of transformer 68 is energized by source 80.

Requirements with regard to circuit parameters and the frequency of energization by source 80 are similar to those applicable to FIGURE 1. Also, the operation of the embodiment of the invention illustrated in FIGURE 2 is substantially the same as that of the embodiment of FIGURE 1, the only difference lying in the operation of switching means 16. In particular, signal 82, generated by source 80, induces signals 84 and 86, of equal magnitude but opposite polarity, in the secondary of transformer 68. Thus, when a positive going signal is being applied to the base of transistor 50, a negative going signal is being applied to the base of transistor 58, and vice versa. Accordingly, transistors 50 and 58 are alternately conductive. As a result, an input signal charges capacitor 22, and when transistor 50 becomes conductive, current flows through the collector-emitter path of transistor 50 and inductor 14. As described in connection with FIGURE 1, such current flow sets up a magnetic field around inductor 14 which is proportional to the input signal.

Transistor 50 then becomes non-conductive, thereby opening input circuit 10, and transistor 58 becomes conductive, thereby closing output circuit 12 by connecting inductor 14 to capacitor 28. The magnetic field which has been set up around inductor 14 tends to maintain the current flow through the collector-emitter path of transistor 58, charging capacitor 28 in a polarity opposite to that of the input signal.

As before, the relative impedance levels of input circuit 10 and output circuit 12 will determine the magnitude of the output signal.

Although the operation of the present invention has been described with reference to waveforms having a sinusoidal shape, it is to be understood that this was merely by way of example and not intended to limit the type of signal which the present invention may invert. In particular, as long as the time constant of input circuit 10 is appreciably less than the frequency of the input signal, accurate signal inversion will result. Further, although specific embodiments of the present invention have been described in detail, it is to be understood that the present invention is intended to include all modifications falling within the scope of the following claims.

What is claimed is:

1. A circuit for inverting the polarity of an electrical signal, comprising: an inductor; input means for applying the signal to said inductor to establish a current in said inductor; a capacitor; and means for intermittently serially connecting said inductor to said capacitor at a rate substantially greater than the frequency of said signal such that the current in said inductor is maintained to thereby charge said capacitor; and output means connected to said capacitor for deriving a signal of inverted polarity.

2. A polarity inverter for an input signal, comprising: an input circuit having first and second terminals and means connected thereto for storing the signal; an output circuit having first and second terminals and means connected thereto for storing an output signal; each of said first terminals connected to a common reference potential; an inductor; and switching means for alternately serially connecting said inductor to said second terminals at a rate appreciably exceeding the frequency of the signal such that any current established in said inductor during the period it is connected to said input circuit is maintained during the period it is connected to said output circuit.

3. The inverter of claim 2, in which said switching means comprises an electromechanical vibrator including a source for energization.

4. The inverter of claim 2, in which said switching means comprises a pair of transistors alternately energized for conductance by an energizing source.

5. The inverter of claim 2, in which said input circuit and said output circuit include capacitors as storage elements.

6. The inverter of claim 2, in which said input circuit and said output circuit include impedance elements for isolation.

7. A circuit for inverting a signal, comprising: an input circuit for receiving the signal and including a capacitor shunted to a reference potential; an output circuit including a capacitor shunted to the reference potential; an inductor having a first terminal connected to the reference potential; and switching means connected to a second terminal of said inductor for alternately connecting said inductor to the capacitors of said input and output circuits at a rate which is substantially greater than the frequency of the signal.

8. The circuit of claim 7 in which said switching means comprises an electromechanical vibrator including a source for energization.

9. The circuit of claim 8 in which said switching means comprises a pair of transistors, the first coupled between the capacitor of said input circuit and the second terminal of said inductor, the second coupled between the second terminal of said inductor and the capacitor of said output circuit, and a signal source operable to alternately excite the transistors at a rate substantially exceeding the frequency of the signal.

References Cited by the Examiner

UNITED STATES PATENTS

| | | | |
|---|---|---|---|
| 2,627,039 | 1/1953 | MacWilliams | 307—88.5 |
| 2,644,893 | 7/1953 | Gehman | 307—88.5 |
| 2,952,785 | 9/1960 | Hodder | 307—88.5 |
| 2,961,553 | 11/1960 | Giger | 307—88.5 |
| 2,987,627 | 6/1961 | Eckert | 307—88.5 |
| 3,018,385 | 1/1962 | O'Berry | 307—88.5 |
| 3,025,448 | 3/1962 | Muchmore | 307—88.5 |
| 3,060,267 | 10/1962 | Feder | 307—88.5 |

OTHER REFERENCES

W. N. Carroll et al.: "Pulse Storage Circuit in IBM Tech. Disclosure Bulletin, vol. 3, No. 6, November 1960.

HERMAN KARL SAALBACH, *Primary Examiner.*

BENNETT G. MILLER, *Examiner.*

UNITED STATES PATENT OFFICE
CERTIFICATE OF CORRECTION

Patent No. 3,219,836                          November 23, 1965

Charles H. Fuller

It is hereby certified that error appears in the above numbered patent requiring correction and that the said Letters Patent should read as corrected below.

Column 4, line 36, for the claim reference numeral "8" read -- 7 --.

Signed and sealed this 19th day of September 1967.

(SEAL)
Attest:

ERNEST W. SWIDER                          EDWARD J. BRENNER
Attesting Officer                            Commissioner of Patents